United States Patent [15] 3,671,777
Newell [45] June 20, 1972

[54] FAST RISE TIME PULSE GENERATOR

[72] Inventor: Harold R. Newell, South Newbury, N.H.
[73] Assignee: Mesur-Matic Electronics Corporation, Warner, N.H.

[22] Filed: March 22, 1968
[21] Appl. No.: 715,372

[52] U.S. Cl. ..............................307/268, 307/258, 307/281, 307/287
[51] Int. Cl. ..............................H03k 17/00
[58] Field of Search ..............................84/1.15 D, 1.16, 1.26; 307/106, 240, 258, 309, 319, 268, 322, 286, 281; 325/185

[56] References Cited
UNITED STATES PATENTS

| | | | |
|---|---|---|---|
| 3,248,470 | 4/1966 | Markowitz et al. | 84/1.26 |
| 3,445,783 | 5/1969 | Roos et al. | 331/51 |

*Primary Examiner*—Donald D. Forrer
*Assistant Examiner*—B. P. Davis
*Attorney*—Hurvitz, Rose & Greene

[57] ABSTRACT

A device for generating fast rise time pulses, in which a mechanico-electric transducer translates mechanical operation or motion to a single electrical output pulse of relatively slow rise time characteristic for application to a semiconductive pulse shaper of monostable or bistable nature for producing a rapid rise time output pulse of the desired shape.

11 Claims, 18 Drawing Figures

INVENTOR
HAROLD R. NEWELL

BY Hurvitz, Rose & Greene
ATTORNEYS

INVENTOR
HAROLD R. NEWELL

BY Hurvitz, Rose & Greene
ATTORNEYS

FAST RISE TIME PULSE GENERATOR

BACKGROUND OF THE INVENTION

The present invention relates generally to devices for converting mechanical energy to electrical energy, including non-dynamo-electric and dynamo-electric apparatus, and more particularly to devices of that character in which the conversion process results in the production of a single pulse or a plurality of pulses of precisely desired number, shaped to have rise times of the order of nanoseconds.

It is often necessary or desirable, particularly in the excitation of digital circuitry, to provide single pulses or multiple pluses of precisely controlled number, with or without periodicity, and with rise times as fast as can be obtained. For example, where the pulse is employed to provide a triggering or switching function for the circuitry that follows, as is often the situation in digital computer or electronic automatic machine control applications, the switching speed is dependent upon the time interval in which the exciting pulse reaches a predetermined voltage (or current) value required to initiate the desired operation. Accordingly, the faster the rise time of the pulse, the shorter is the time delay experienced to implement a specified function in the overall circuit or machine operation.

As a consequence of the desirability of fast rise time pulses, initiation of the pulse is normally achieved by means of electronic switching or pulse generating devices. Since rise time of the pulse is dependent upon time constant of the circuit and since rapid electronic, notably semiconducting switching devices are available, it has been proposed in the past to generate fast rise time pulses by use of a semiconductor bistable switch, for example. Referring to one prior art circuit of this general type, disclosed in U.S. Pat. No. 3,183,375 issued May 11, 1965, to W. V. Harrison, a resistor and tunnel diode are connected in series across the output terminals of a source of periodic voltage such as an a-c signal generator, the voltage having a peak amplitude greater than that required to switch the tunnel diode through its negative resistance region (of its voltage-current characteristics curve). Accordingly, the tunnel diode is periodically switched from a low voltage state to a high voltage state, and back to the low voltage state when the a-c excitation voltage drops below the critical value, so that a train of pulses having leading edges with rapid rise times is generated across the terminals or electrodes of the tunnel diode. These output pulses are differentiated by an R-C circuit whose time constant is of the same order of magnitude as the switching time (also appropriately termed a "time constant") to provide a series of spikes having a pulse repetition frequency (PRF) corresponding to the frequency of the a-c excitation signal.

It is often necessary, however, to provide fast rise time pulses in accordance with the actuation of a thumb-operated push button or other mechanical means such as levers or cams on machinery, or air pressure, hydraulic pressure, solenoids, relay armatures, electric motors, and so forth. The problem arises as to how one can supply a suitable excitation signal to a wave shaper such as those employed in the prior art as noted above, and further, with the assurance that the excitation signal occurs only once for each mechanical operation to be converted to an electrical output.

Accordingly, it is a broad object of the present invention to provide mechanico-electrical transducer apparatus for converting mechanical energy to a fast rise time electrical pulse.

SUMMARY OF THE INVENTION

Briefly, according to the present invention, the fast rise time pulse generator includes a mechanically operated pulse generator of either dynamo-electric or non-dynamoelectric type, such as piezoelectric or electro-magnetic or magnetostrictive devices, so constructed as to produce one pulse (or excitation signal) and only one pulse for each mechanical actuation thereof, and semiconductive pulse shaping means responsive to the output pulse deriving from the mechanically operated pulse generator for producing a fast rise time pulse therefrom.

In a preferred embodiment of the invention the mechanically operated pulse generator comprises a push button operating in conjunction with a release mechanism for rapidly (insofar as mechanical actuation will permit) varying the character of the magnetic flux path of an inductor each time the button is pushed, whereby to correspondingly rapidly vary the intensity or number of permanent magnetic flux lines traversing that path to cause the generation of a pulse at the ends or terminals of the inductor. The slow rise time pulse so generated, which may be amplified if of insufficient amplitude to act as an excitation signal for the pulse shaping circuitry, is applied to the pulse shaper which, in the preferred embodiment, comprises a tunnel diode and transistor circuit, in which the transistor or other semiconductor amplifier has its output electrodes coupled across the total output voltage of the mechanically actuated pulse generator. When the tunnel diode is switched from the low to the high voltage state the fast rise time pulse is applied to the transistor to switch it from a normally non-conductive state (cutoff) to a conductive state (preferably in the saturation region), and a considerable change in voltage occurs across the output electrodes of the transistor, approaching the total generator voltage. This output pulse of the transistor has a rise time substantially equal to that of the pulse produced across the tunnel diode, provided the transistor used is capable of the appropriate switching speed, and may be differentiated to produce a sharp pulse or spike and/or to produce a train of pulses.

It is a feature of the present invention that the overall pulse generator requires no external power, i.e., is capable of operation solely on the electrical energy obtained from the conversion of mechanical energy expended in actuation of the mechanico-electrical transducer.

A further feature of the present invention resides in the provision of circuitry of the type described briefly above, in which the pulse shaping network includes a plurality of tunnel diodes or comparable semiconducting devices, each having a different "break point" (i.e., operating point), for generating a group of pulses of corresponding number and of controlled spacing, with each single mechanical actuation.

BRIEF DESCRIPTION OF THE DRAWINGS

The above and still further objects, features and advantages of the present invention will become apparent from consideration of the following detailed description of one specific embodiment thereof, especially when taken in conjunction with the accompanying drawing, wherein.

DESCRIPTION OF THE PREFERRED EMBODIMENT

Figure 1A:
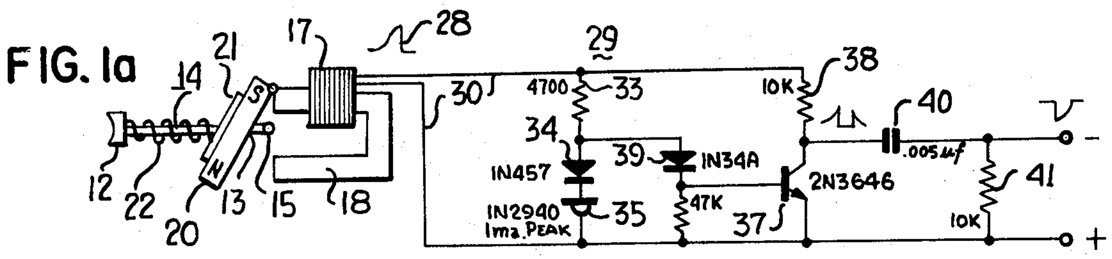
FIG. 1(*a*) is a diagram of the mechanical structure and circuitry of an exemplary embodiment of the overall fast rise pulse generator according to the invention, and FIG. 1(*b*) is a bottom view of the mechanical transducer of FIG. 1(*a*)
Figure 1B:
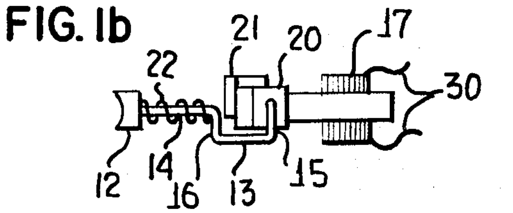

Referring now to FIG. 1, an illustrative embodiment of the overall pulse generator of the invention includes a mechanico-electrical transducer 10 for converting mechanical energy, expended in the operation of a thumb operated push button 12, for example, and of an energy storage device or devices, such as a spring, into a slow rise time electrical pulse. The pulse generator further includes a pulse shaping network 29 for translating the slow rise time pulse produced by transducer 10 to a fast rise time pulse suitable for driving digital circuitry.

As shown in FIG. 1, mechanico-electrical transducer 10 is preferably of a 13, in which a voltage is generated in response to the interruption or alteration of a magnetic field surrounding a coil of wire. Since the energy conversion is accomplished by magnetic induction, transducer 10 falls within the broad class of dynamoelectric devices although as will presently be discussed in greater detail, other types of transducers, such as non-dynamoelectric varieties, may also be utilized. In the specific transducer of FIGS. 1(*a*) and (*b*) a coil of wire 17 is wound on a U-shaped magnetically permeable core 18 and a magnetic toggle action is used to assure rapid rate of buildup of magnetic field independent of speed at which a push button 12 is depressed. Push button 12 is attached to a U-shaped member 13 by a rod 14. Member 13 has parallel portions 15, 16 which can ride against the inside or outside faces of a magnet or magnetic armature 20. In its normally non-actuated position, magnet 20 seats against a permeable retainer 21 by virtue of magnetic attraction, and member portion 15 bears against the inside face of the magnet as the result of the restoring force of a return spring 22 for the push button. In essence, the permeable retainer 21 acts as a "keeper" to retain the magnet in a stable position during periods of non-actuation of the switch.

Depression of button 12 forces member portion 16 against magnet 20, and when the force on the latter exceeds that of magnetic attraction of "keeper" 21, the magnet snaps across the ends of core 18 in bridging fashion. The sudden buildup of magnetic flux that accompanies the seating of the magnet against the U-shaped core results in the generation of a voltage pulse 28 in coil 17. Upon release of the push button, the restoring force of spring 22 is sufficient to unseat the magnet from the core, beyond the point of magnetic attraction between core and keeper, and to its original stable position against the keeper as shown in the Figure. The opposite polarity pulse (to that of pulse 28) generated upon return of the magnet to the normal (i.e., non-actuated) position is filtered out by the pulse shaping network to be described presently.

The slow rise time pulse generated by transducer 10 has typically been found to be in excess of 5 volts amplitude in constructed embodiments of the invention, with a width (or duration) of from about 2 to about 5 milliseconds and a rise time of between 0.25 and 2 milliseconds. Clearly, this type of pulse is unsuitable as an excitation signal, such as a trigger, for driving digital circuitry.

To provide the desired fast rise time pulse, the pulse 28 is applied to shaping network 29 via leads 30 connected to the ends of coil 17. The shaping network includes the series circuit of a resistor 33, silicon diode 34, and tunnel diode 35. The tunnel diode may be of any type suitable for operation with the voltage and current levels supplied by pulse 28. By way of example, component values and designations are shown for network 29 of FIG. 1. These values are, of course, strictly for the sake of illustration and are not intended as limitations upon the scope of the invention, bearing in mind that the shaping network should be capable of operating on the voltage furnished by the pulse 28 without need for external sources of power. A silicon transistor 37 has its collector-emitter path connected in series with a resistor 38 across the circuit path containing resistance 33 and diodes 34 and 35, and has its base electrode coupled to the junction of resistor 33 and silicon diode 34 via a germanium diode 39. Transistor 37 is a high-speed switch, and because of its silicon composition, has a relatively large base-to-emitter voltage drop, exceeding the voltage drop across the tunnel diode when the latter is triggered into conduction. Dropping of this extra voltage to assure turn-on of the transistor is achieved by use of the silicon diode 34 and germanium diode 39. The silicon diode adds a voltage drop equal to the base-to-emitter drop of transistor 37, and the germanium diode effectively subtracts enough voltage to assure that the silicon transistor is not rendered conductive until the tunnel diode assumes a high voltage condition.

In operation of the circuit of FIG. 1, prior to the instant at which the current level through tunnel diode 35 reaches the peak point (i.e., the switching point for the diode), the voltage across the tunnel diode and thus across the base-emitter circuit of transistor 37 is insufficient to turn on the transistor (i.e., to drive the transistor output circuit to a low impedance state, as occurs in saturation). When the current level as determined by the slow rise time input pulse from transducer 10 reaches the switching point, the voltage across the tunnel diode suddenly increases to a value exceeding that required to turn the transistor on. The collector to emitter voltage then drops suddenly from the total voltage output of the transducer (i.e., peak level of pulse 28, or thereabout) to a very low level consistent with the low value of resistance now presented in the transistor output circuit. I have observed that this reduction in voltage level takes place within a time interval typically less than 50 nanoseconds, in embodiments constructed according to the principles set forth herein.

A differentiating circuit such as that comprising capacitor 40 and resistor 41 may be employed to convert this rapid voltage drop at the collector (relative to the emitter) to a sharp pulse as indicated at 43.

Certain points regarding the supplying of the slow rise pulse to the shaping network are to be observed. For example, the voltage level should be sufficiently high that a pulse of adequate level is produced when the shaping network fires. Another consideration is that the "stiffness" of the transducer output, i.e., the ability to supply current, be sufficient to meet the requirement of extra current, when the shaper circuit is fired, as to maintain the transducer voltage at a high enough level to prevent reversion of the tunnel diode to its low voltage state. Otherwise, spurious pulses will be produced.

"Stiffness" of transducers of the magnetic type is improved by use of a larger magnet, for greater magnetic flux, and a smaller number of turns of larger diameter wire, within the confines of the overall requirement of a given level of voltage. The voltage level may be increased without increasing the number of turns of wire or the size of the magnet, by increasing the distance through which the magnet moves prior to striking the core face, thereby increasing the maximum velocity of the moving magnet. However, this increases the possibility of contact bounce, which can result in the generation of spurious pulses, and which therefore must be considered.

Figure 2:
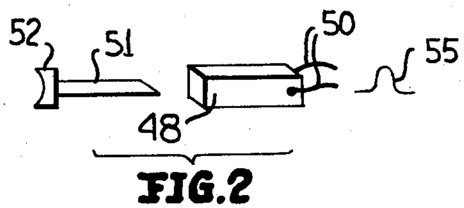
FIGS. 2–6 show several alternative embodiments of the mechanico-electrical transducer used in the pulse generator of FIG. 1.

FIGS. 2 through 6, inclusive, illustrate some of the possible alternatives for the mechanico-electrical transducer 10 of FIG. 1. In FIG. 2, the alternative embodiment is of non-dynamoelectric type comprising piezoelectric element (crystal) 48 having electrodes 50 cemented thereto and arranged to be struck by a rod 51 attached to push button 52 when the latter is depressed. The strain exerted on the crystal results in the production of an output pulse 55 at electrodes 50, in a known manner.

Figure 3:
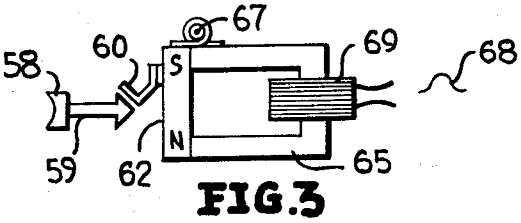

Referring to FIG. 3, the transducer 10 has a push button 58, which when depressed, forces rod 59 against a spring 60. The spring is thereby forced upwardly, exerting a laterally applied force on the north pole end of magnet 62. When this force exceeds that accompanying magnetic attraction between permanent magnet 62 and permeable core 65, the former is pivoted about spring 67, thereby causing the production of a slow rise time pulse 68 from coil 69 in the manner described in detail with respect to the embodiment of FIG. 1.

Figure 4:
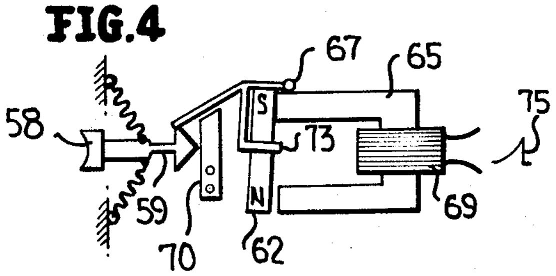

In FIG. 4, like components of the embodiment of FIG. 3 are referenced by like numerals. Here, depression of push button 58 is effective to force restraining spring 70 from its normal position, as shown, to release magnet lift lever 72, and thus permit magnet 62 to "fly," i.e., to move rapidly, against the end of core 65 from which it is normally spaced, thereby generating a pulse of voltage 75 in coil 69. Release of the button returns the various components to their normal positions, to allow selective renewal of the cycle by again depressing the button.

Figure 5:
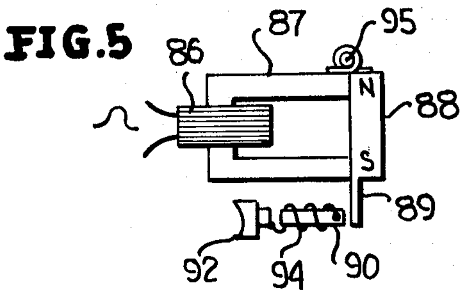

Referring to FIG. 5, an alternative embodiment of mechanico-electrical transducer 10, a coil of wire 86 is wound on a U-shaped core 87, the ends of which are normally bridged by a permanent magnet or magnetic armature 88. Push button 92 is attached through spring 94 to plunger 90 so that, when the button is depressed, plunger 90 pushes with increasing force against magnet extension member 89 until the force due to compression of spring 94 is great enough to unseat magnet 88 from the pole faces of U-shaped core 87. Expansion of compressed spring 94 causes magnet 88 to move away from pole faces with considerable rapidity, causing the magnetic field around coil 86 to decay rapidly, inducing a pulse of voltage. Attraction of magnet 88 to core 87 returns push button 92 to its normal position and reseats magnet 88 against core 87 when the button is released.

It should be noted that the transducer 10 of FIG. 1 is preferred over the other embodiments for a variety of reasons. For example, the transducer of FIG. 1 produces a higher level of voltage with a given magnetic flux density and number of turns of wire than is available with the transducers of FIGS. 3 and 5. The reason is that the magnet, and therefore the magnetic lines of force, is moving most swiftly as the flux density reaches its peak, i.e., just prior to contact between the magnet and the core faces. Moreover, the magnetic toggle action is produced with the transducer of FIG. 1 with a far simpler, and thus more inexpensive, construction than with that of FIG. 4. Nevertheless, the alternative transducer embodiments are suitable for generation of the slow rise time pulse.

Figure 6A:
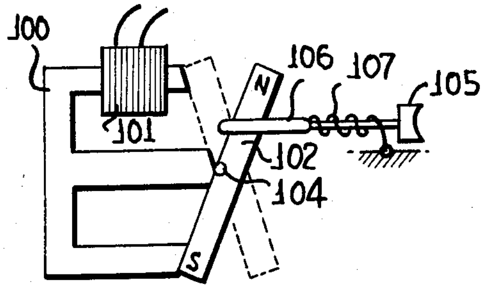
Figure 6B:
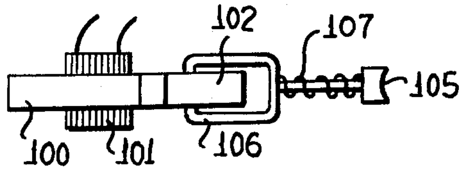

In FIGS. 6 (*a*) and (*b*), showing side elevation and bottom views, respectively, an E-shaped laminated core 100 is provided with a coil 101 on one outer leg thereof and a permanent magnet 102 fastened to the center leg by a pivotal coupling member 104. This embodiment is particularly adapted for use in those situations where the overall unit may be subjected to severe shock or vibration, which might result in undesired movement of the magnet. To prevent such an occurrence, magnetic armature 102 is balanced on its pivot to render it insensitive to externally applied forces except those tending to produce rotation about the pivot point. Magnet 102 therefore has two stable positions, one in which it rests against the upper and center legs, and the other against the lower and center legs. Push button 105 is attached to cage member 106 via a rod, the cage member being somewhat oversize to allow some freedom of movement before actuation and/or return of the magnet. When button 105 is depressed, the magnet is forced away from its position as indicated in the Figure, and snaps into the position as shown in dotted outline, resulting in generation of a pulse. The return spring 107 exerts a force sufficient to return the magnet to its original position, via contact with cage member 106.

Figure 7:
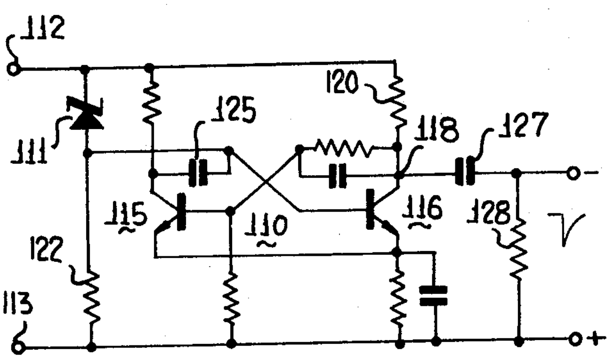
FIGS. 7–14 show several alternative embodiments of the circuit portion of the pulse generator of FIG. 1.

Referring now to FIGS. 7 through 13, each showing an alternative embodiment of the pulse shaping network of Figure 1, the embodiment of FIG. 7 includes a monostable (one-shot) multivibrator 110 and Zener diode 111. The slow rise time pulse produced by transducer 10 and appearing across terminals 112, 113 turns on transistor 115 first, holding transistor 116 "off" for the present. Capacitor 127, connected along with resistor 128 to terminals 118, 119 of the embodiment of FIG. 7 in the manner shown in FIG. 1, charges through resistors 120 and 128 to the level of the input pulse. When the input pulse level reaches the breakdown voltage of Zener diode 111 and the voltage rises across resistor 122, transistor 116 turns on and transistor 115 is turned off. The rapidly rising voltage level at the collector of transistor 115, accompanying cutoff of the transistor, is applied to the base electrode of transistor 116 via capacitor 125 thereby increasing the speed at which the latter transistor is rendered conductive. As the collector of transistor 116 rapidly drops toward common potential, capacitor 127 discharges through resistor 128 to produce the desired fast rise time output pulse.

Figure 8A:
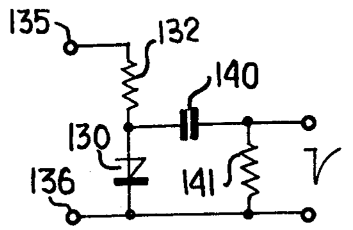
Figure 8B:
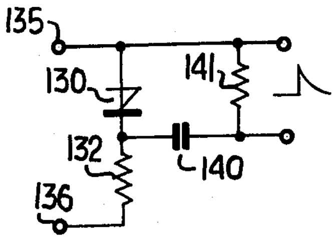
Figure 8C:
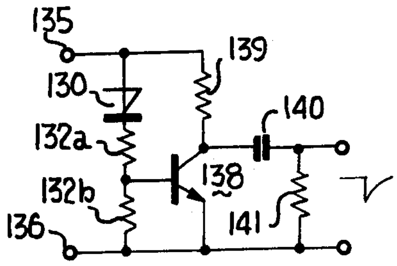

In FIGS. 8(*a*), (*b*), and (*c*), embodiments of the pulse shaping network are shown in which a four layer diode (i.e., Motorola M4L20 series) is utilized to produce the fast rise pulse. The four layer diode 130 is connected in series circuit with a resistance 132 across the terminals 135, 136 to which the output terminals of transducer 10 are connected. In each of the circuits shown in FIGS. 8(*a*) and 8(*b*), the diode "fires" at a point along the leading edge of the slow rise pulse emanating from the transducer, thereby producing the output pulse. For the output connections shown in FIGS. 8(*a*), a negative-going pulse is generated, whereas in FIG. 8(*b*) a positive-going pulse is produced, across the terminals of resistor 141. In the circuit of FIG. 8(*c*) the output terminals of transistor 138 are connected across the differentiating network composed of capacitor 140 and resistor 141. The capacitor charges toward the level of the input pulse (from transducer 10) through resistor 139 until diode 130 breaks down, turning on transistor 138. The capacitor then discharges through the path including resistor 141 and the output path of the transistor, thereby enhancing the rapid rise time of the pulse generated at the output terminals of the circuit.

Figure 9:
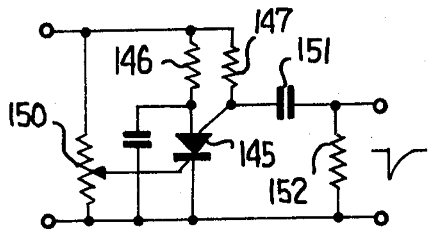

In the embodiment of FIG. 9, a PNPN switch (i.e., SCS) 145 (e.g., GE type 3N82) is connected in series circuit with resistor 146 across the input terminals of the shaping network. The slow rise pulse from transducer 10 is applied to the anode and anode-gate of the SCS, and charges capacitor 151 through resistors 147 and 152. The input pulse is also applied to potentiometer 150 whose tap or slider is connected to the cathode-gate of the SCS. When the voltage at the slider is sufficiently large, typically at some point along the leading edge of the input pulse, as controlled by the setting of the slider, SCS 145 suddenly conducts and capacitor 151 is discharged through resistor 152, producing the fast rise time output pulse.

Figure 10:
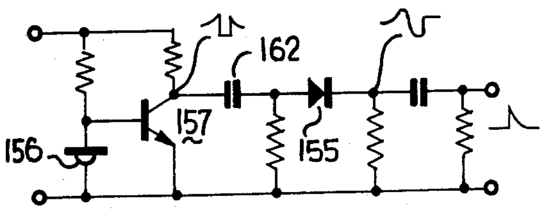
Figure 11:
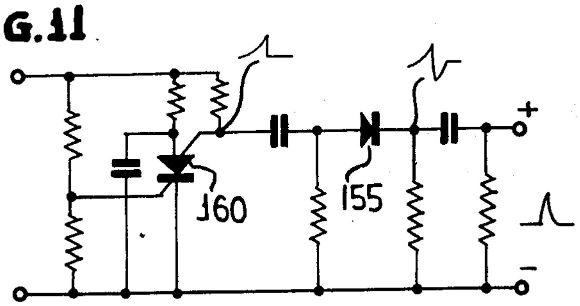

In the embodiments of FIGS. 10 and 11, the pulse shaping networks take advantage of the characteristics of a step recovery diode 155 (e.g., HPA 0251, of the rapid recovery type, or HPA 0114, of the slower recovery type). In essence, the step recovery diode suddenly reverts to the high resistance blocking condition under reverse bias only after depletion of charge stored while the diode was forward-biased into conduction. Recovery times as short as 0.1 nanosecond have been obtained for some diodes of this general type.

In the circuit of FIG. 10, the step recovery diode 155 is a rapid recovery type (e.g., HPA 0251), and a tunnel diode 156 and transistor 157 circuit of the type shown in FIG. 1 is used to provide the desired rapid voltage reversal. In the circuit of FIG. 11, diode 155 is a slower recovery type (e.g., HPA 0114), and an SCS 160 circuit of the type shown in FIG. 9 is employed for the driving waveform generation. In both circuits, it is essential that the charge stored in the step recovery diode be depleted while maximum reverse voltage is being supplied to the diode, if the output pulse is to be of the same level as the maximum applied reverse voltage. Accordingly, the speed of operation (or "time constant") of the remainder of the pulse shaping network must be compatible with the recovery speed of the step diode.

In operation of each of the circuits of FIGS. 10 and 11, the current flowing into capacitor 162 to charge it, during the rise in level of the input pulse, also flows through diode 155 in the forward direction. The diode thereby stores a "charge." The capacitor 162 is discharged when transistor 157 (for FIG. 10) or SCS 160 (for FIG. 11) turns on, producing a current in the reverse direction through diode 155 until the stored charge on the diode is depleted, at which time the diode reverts to the blocking condition, resulting in a fast rise output pulse at the output terminals of the differentiating network. The alternative character of the pulse shaping networks of FIGS. 10 and 11 is based solely on the aforementioned requirement of circuit operational speed consistent with diode recovery speed.

Figure 12:
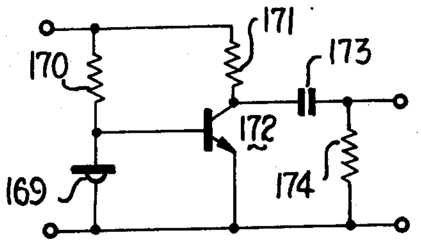

Referring now to FIG. 12, the circuit embodiment there shown uses a germanium transistor, rather than a silicon transistor as is utilized in the pulse shaper embodiments of FIG. 1. Accordingly, the silicon diode and germanium diode of the FIG. 1 embodiment are not required, but a reduction in switching speed is suffered. The output of transducer 10 is applied to the series circuit of a resistor 170 and tunnel diode 169, across which is connected a resistor 171 and the output circuit of transistor 172. The base electrode of the transistor is connected to the junction of resistor 170 and the tunnel diode. Circuit operation is basically similar to that described for the shaping network of FIG. 1. The capacitor 173 of the differentiating network discharges through resistor 174 when transistor 172 is driven into conduction, thereby producing the fast rise-time pulse across the terminals of the latter resistor.

Figure 13:
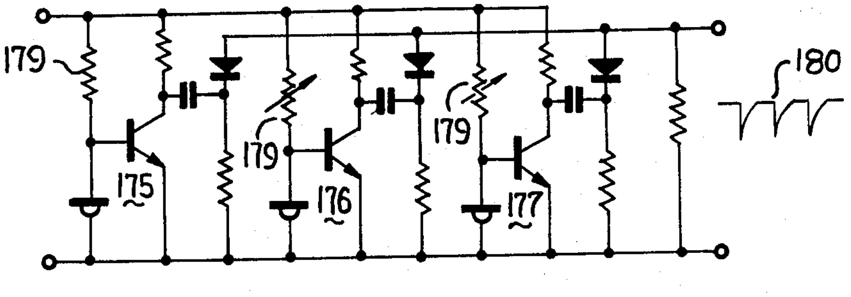

Referring now to FIG. 13, the circuit embodiment employs more than one tunnel diode-transistor combination, namely, those designated 175, 176, and 177, each such trigger combination having a break point differing from the other to produce a group of pulses 180 for each single actuation of transducer 10. Moreover, the spacing between adjacent or successive pulses of the group may be varied by appropriate variation of the resistor 179 in series with the respective tunnel diode. Operation otherwise corresponds to that discussed above in connection with the embodiment of FIG. 1.

Figure 14:
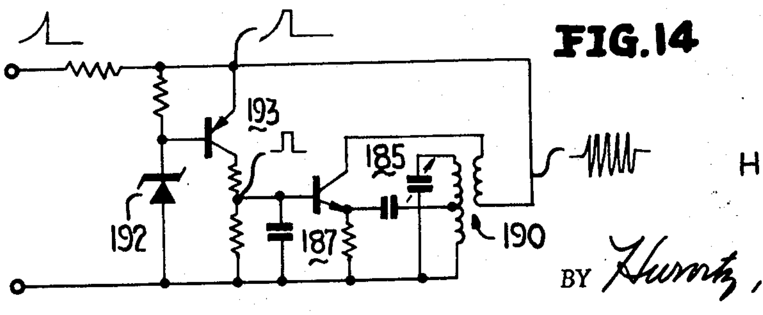

Referring now to FIG. 14, a high frequency pulse generator is provided in accordance with my invention by applying the output of the transducer 10 of FIG. 1, for example, to a high frequency oscillator 185. The oscillator includes a transistor 187 and frequency-determining elements, including a feedback transformer, generally designated by reference numeral 190. Ideally, each pulse generated by the transducer results in the production of several cycles of high frequency signal from the oscillator. To maintain a reasonably stable high frequency output, however, a fairly constant voltage must be supplied to the oscillator. To this end, the normally peaked transducer output is "flattened" by use of a Zener diode 192 and a transistor switch 193 having its base connected to the cathode of the diode, such that when the Zener draws appreciable current the high frequency oscillator is turned on. The duration of oscillation is limited only by the width of the transducer pulse.

While I have disclosed certain preferred embodiments of my invention, it will be apparent to those skilled in the art to which the invention pertains that variations in the details of construction which have been illustrated and described may be resorted to without departing from the spirit and scope of the invention as defined in the appended claims.

I claim:

1. A pulse generator comprising a selectively actuable mechanicoelectric transducer for converting mechanical energy to electrical energy in the form of a single slow rise time pulse in response to each single actuation thereof; and a pulse shaping network responsive to the slow rise time pulse deriving from said transducer for translation thereof to a relatively fast rise time pulse, said network including a semiconductive switching device coupled to the output terminals of said transducer, said switching device operative to switch between a high impedance current blocking condition and a low impedance current passing condition at a voltage level of said slow rise time pulse appearing along the leading edge thereof, said transducer including means for preventing the production of more than a single slow rise time pulse of one polarity in response to a single actuation of said transducer, wherein said semiconductive switching device comprises a tunnel diode connected in series circuit with a resistance across said output terminals of said transducer, and a transistor having its input circuit coupled across said tunnel diode and having its output circuit coupled across said transducer output terminals.

2. The invention according to claim 1 wherein said semiconductive switching device includes a plurality of said tunnel diode-resistance series circuits, and a plurality of said transistors, each said tunnel diode-transistor combination having a switching point differing from that of each of the other of said combinations to produce a group of fast rise time pulses in response to a single slow rise time pulse from said transducer, each of said resistance in series circuit with said tunnel diode being variable to vary the spacing between respective adjacent pulses of said group.

3. A system for converting a pulse having a relatively slow rise time to a pulse having a relatively fast rise time comprising, a two terminal source of said pulse having a relatively slow rise time, a resistance, a fast switching device normally nonconductive adapted to become conductive in response to application of a predetermined voltage thereto, said predetermined voltage being attainable during said relatively slow rise time, means connecting said resistance and said fast switching device in series across said two terminal source, a solid state switching device having a gate electrode connected to a point between said resistance and said switching device and means connecting said solid state switching device across said two terminal source, and a load circuit connected to be energized via said solid state switching device.

4. The combination according to claim 3, wherein said source is a key actuated inductive pulse generator.

5. The combination according to claim 3, wherein said solid state switching device is a transistor.

6. The combination according to claim 5, wherein said fast switching device is a tunnel diode.

7. The combination according to claim 5, wherein said fast switching device is a Zener diode.

8. The combination according to claim 5, wherein said fast switching device is a solid state silicon diode connected in the conductive direction and a tunnel diode in series with said solid state silicon diode.

9. The combination according to claim 5, wherein said fast switching device is a four layer diode.

10. The combination according to claim 5, wherein said load circuit includes a capacitor and a step recovery diode in series with said capacitor, a discharge path for said capacitor connected between the junction of said capacitor and an electrode of said fast recovery diode and a reference point, and a load resistance connected between the remaining terminal of said fast recovery diode and said reference point.

11. The combination according to claim 3, wherein said load circuit includes a capacitor and a step recovery diode in series with said capacitor, a discharge path for said capacitor connected between the junction of said capacitor and an electrode of said step recovery diode and a reference point, and a load resistance connected between the remaining terminal of said fast recovery diode and said reference point.

* * * * *